June 24, 1947.  C. F. WOOD  2,422,942

CUTTER BAR

Filed Aug. 15, 1944  2 Sheets-Sheet 2

INVENTOR.
Chester F. Wood
BY
Clark & Ott
ATTORNEYS

Patented June 24, 1947

2,422,942

UNITED STATES PATENT OFFICE 2,422,942

CUTTER BAR

Chester F. Wood, Stony Brook, N. Y.

Application August 15, 1944, Serial No. 549,519

2 Claims. (Cl. 56—297)

This invention has general reference to cutting implements and pertains more particularly to an improvement in cutter or sickle bars for mowing machines such as are employed for cutting grass or hay or for use in a device for trimming hedges.

The invention broadly comprehends an improved cutter bar having a plurality of pivoted cutter blades which are mounted and actuated so that each blade alternately swings with reference to adjacent blades on either side thereof to provide cooperative shearing edges which are both in motion thus affording a more effective shearing action while making for a wider opening of the shearing edges for admission of the material to be cut.

The invention further resides in the provision of a novel and effective means for mounting and actuating the blades by a cam arrangement and reciprocatory thrust elements.

As a still further feature, the invention contemplates a cam arrangement and mounting therefor which may be readily assembled initially and subsequently disassembled and reassembled with the greatest facility so that damaged or worn parts may be easily repaired and or replaced when necessary and at a minimum of expense.

The invention is furthermore directed to an improved manner of transmitting swinging motion to the cutter blades by means of thrust elements impinging against the blade shoulders so that there is no positive connection between the blades and thrust elements requiring disconnection when removing the blades for sharpening the shearing edges.

With the above recited and other objectives in view, the invention is set forth in greater detail in the following specification, particularly pointed out in the appended claims and illustrated in the accompanying drawings, in which:

Figure 1:
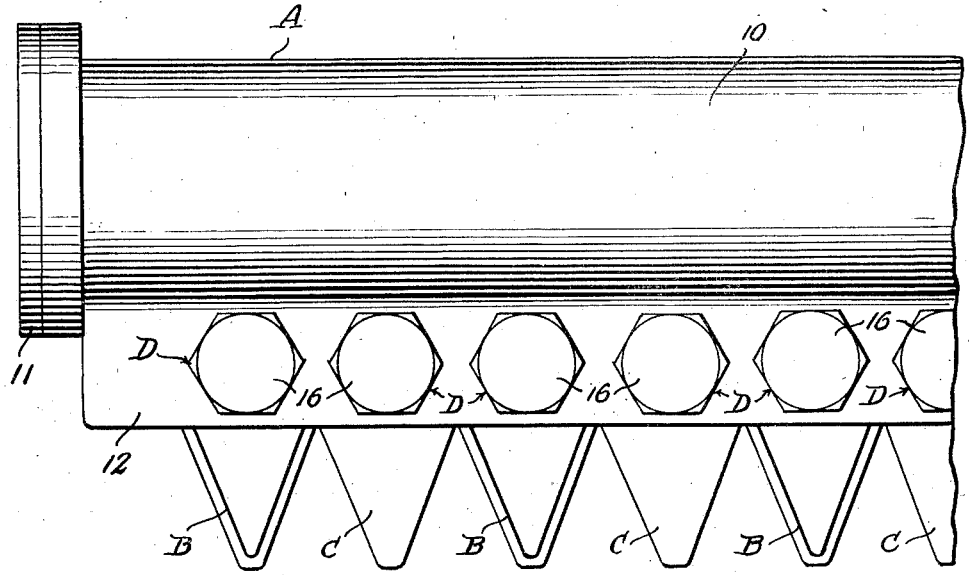
Fig. 1 is a fragmentary top plan view of a cutter bar constructed in accordance with the present invention.
Figure 2:
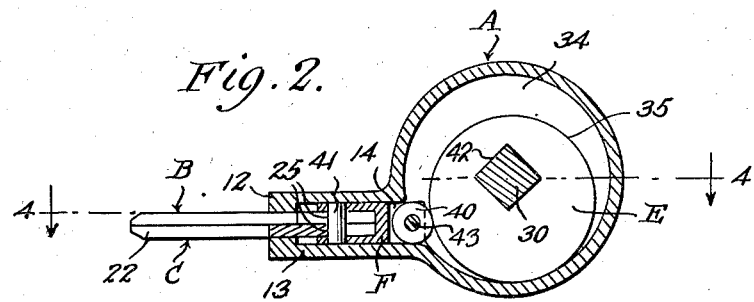
Fig. 2 is a transverse sectional view taken approximately on the line 2—2 of Fig. 4.
Figure 3:
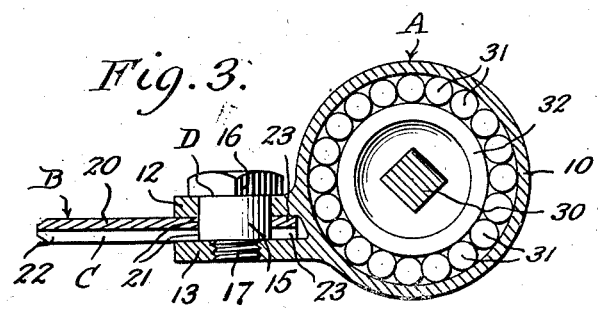
Fig. 3 is a similar view taken approximately on the line 3—3 of Fig. 4.
Figure 4:
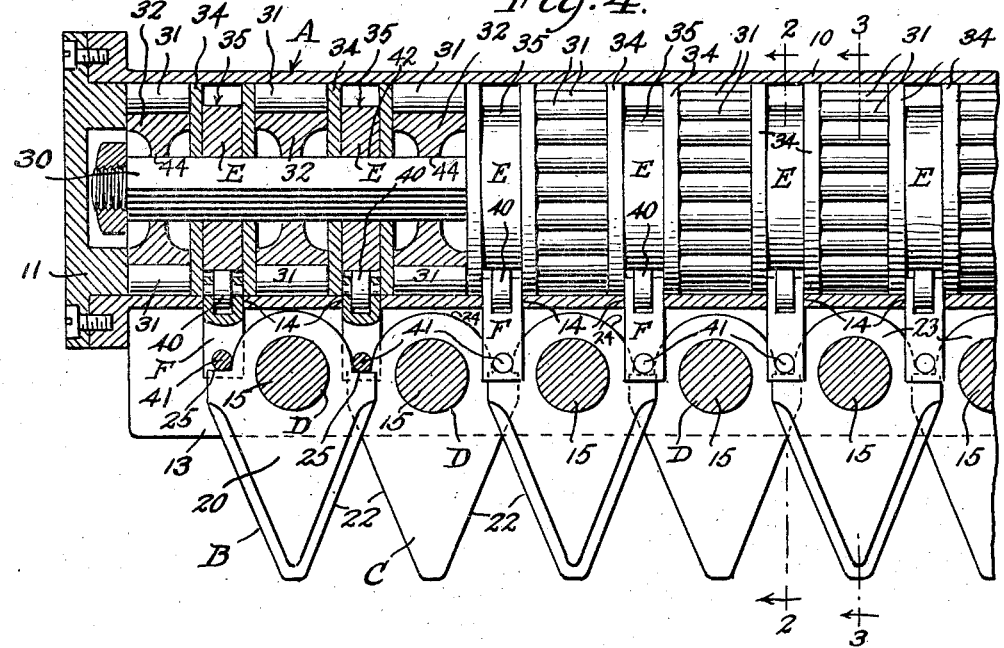
Fig. 4 is a longitudinal sectional plan view taken approximately on the line 4—4 of Fig. 2, showing the cutter blades in a neutral position with parts shown in elevation.
Figure 5:
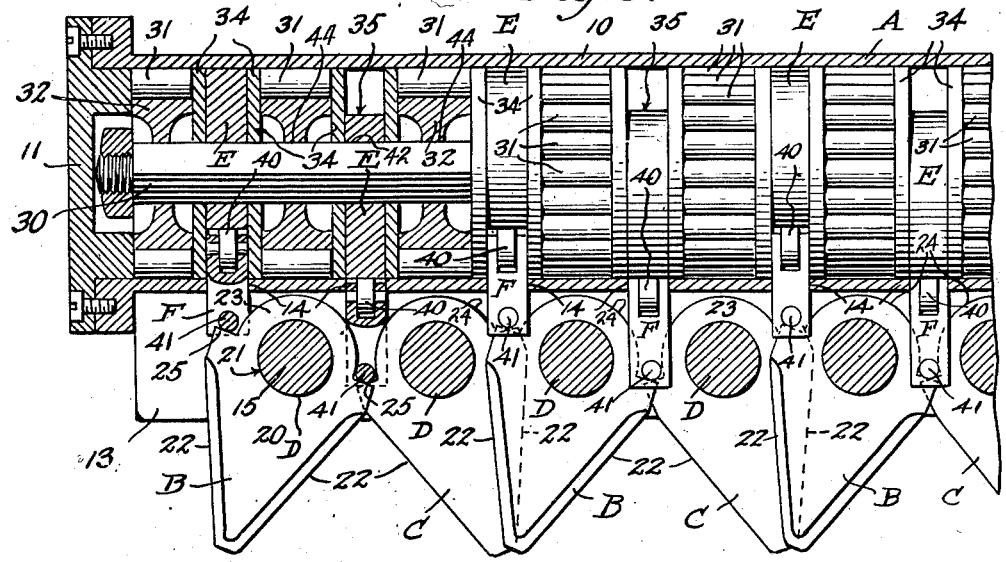
Fig. 5 is a similar sectional view showing the relation of the cutter blades upon completion of a cutting operation with parts shown in elevation.

Referring to the drawings by characters of reference, A designates generally a housing or casing which includes a hollow cylinder or tube 10, each end of which is closed by a cap or cover member 11, and which cylinder or tube 10 has secured thereto or formed as an integral part thereof, a pair of spaced parallel flanges 12 and 13, extending longitudinally thereof and projecting laterally therefrom, said cylinder or tube being formed with longitudinally spaced apertures 14 which open between the flanges and serve a purpose which will be hereinafter explained.

A plurality of upper and lower cutter blades respectively designated generally by the reference characters B and C are mounted between the flanges 12 and 13 for relative swinging movement with reference to each other by means of pivot members D, one for each blade, and which members, as shown, are in the form of a screw including a cylindrical shank 15 having an enlarged head 16 adapted to overlie the upper flange 12 and a reduced threaded terminal 17 threadedly engaging the lower flange 13. The blades B and C are identical in construction and each includes a main body portion 20 and has a bearing opening 21 through which the shank 15 of a pivot member D extends, the side edges 22 of said body portion converging toward each other outwardly in a direction away from the pivotal bearing opening 21.

As illustrated the upper blades B are arranged in a common plane superposed with reference to the common plane in which the lower blades C are disposed, with the side edge portions of the upper or superposed blades overlapping the side edge portions the adjacent lower or subterposed blades C on either side thereof, so that the edges 22 constitute shearing edges which cooperate with those of adjacent blades when moved across each other. The heel portion 23, located diametrically opposite to the main body portion 20 of each cutter blade B and C, is formed with a convex semicircular marginal edge 24, concentric with the bearing opening 21 and each blade is further formed wtih a pair of oppositely arranged shoulders 25 at the juncture of the main body and heel portions 20 and 23, which shoulders are disposed radially with reference to the pivotal axis of the blades, with the shoulders of adjacent blades arranged in overlapping relation.

The means for imparting reciprocatory swinging movement to the blades B and C includes a rotary shaft 30, which may be driven in any suitable manner and by any desired means (not shown). The shaft extends longitudinally or axially of cylinder or tube 10 and is mounted concentric therewith upon sets of bearing rollers 31 which are arranged in surrounding relation to bearing hubs 32 rotatable with the shaft 30, which, as shown, is accomplished by making the drive shaft 30 square in cross-section and fitting the same into square openings 44 in the hubs 32. As illustrated, the roller bearing sets 31 and the bearing hubs 32 are spaced longitudinally of the shaft and housing and are located between pairs of partition disks 34 or at the ends between one of said partition disks and the cap 11, with the roller bearings 31 engaging the outer peripheries of the hubs 32 and the inner periphery of the cylinder 10. The roller bearing sets 31 correspond in number and arrangement to the cutter blades and each adjacent pair of roller bearing sets has interposed therebetween a cam disk E, the outer periphery of which is eccentric to the axis of the drive shaft 30 and in registry with an aperture 14, each of which apertures aligns with the overlapping shoulders 25 of adjacent upper and lower cutter blades B and C. The cam disks E are likewise formed with square openings 42 fitting the shaft 30 or otherwise associated therewith to be turned by and with the same, adjacent cam disks being oppositely set, that is, alternate disks have the high points of their peripheries 35 disposed diametrically opposite to the high points of the intervening or adjacent disks.

In order to transmit the cam action to the blades B and C upon rotation of the drive shaft 30, thrust elements F are provided and arranged respectively for sliding movement in the apertures 14 of the cylinder 10. The thrust elements preferably consist of a length of square stock which is vertically bifurcated at the inner end and has journaled between the furcations thereof, on a stub shaft 43, a cam follower roller 40 engageable with the periphery 35 of its cam E. The opposite outer end of each thrust element F is horizontally bifurcated, with the furcations thereof straddling the overlapped shoulders 25 of a pair of adjacent upper and lower cutter blades B and C and said furcations have extending therethrough in spanning relation thereto a thrust pin 41 engaging against the edges of the overlapped shoulders 25.

From the foregoing construction and arrangement, it will be apparent that upon each half revolution of the drive shaft 30, the cam disks E will be turned therewith so that alternate cam disks will effect relative outward sliding movement of their respective thrust elements F to thereby urge the thrust pins 41 thereof against the overlapped shoulders 25 at one side of each of the cutter blades B and C to move the same in directions whereby the shearing edges 22, adjacent to said outwardly moved shoulders, are moved away from each other causing the opposite shoulders 25 to be moved inwardly for engaging with and urging the thrust pins 41 of the remaining alternate thrust elements F inwardly to cause the cam rollers 40 of said elements to follow the peripheries of their cams E. While the said first mentioned adjacent shearing edges 22 at one side of each of the alternate pairs of blades B and C are being swung away from each other, the opposite adjacent shearing edges of the remaining alternate pairs of cutter blades will be swung across each other to sever the material therebetween. The next succeeding half revolution of the drive shaft will effect a similar operation of the parts to cause the relatively separated shearing edges to move toward and across each other while those which have crossed one another will be uncrossed and swung apart.

It is also evident from the disclosure that the assembly and disassembly of the cam disks E, roller bearings 31, bearing hubs 32 and separator disks 34 with the drive shaft 30 and the cylinder 10 of the housing A may be readily accomplished while the removal and replacement of the cutter blades B and C together with the thrust elements F may easily be performed by the removal and replacement of the pivot members or screws D.

What is claimed is:

1. In a cutter bar of the type including a plurality of upper and lower cutter blades having outwardly converging shearing edges at the opposite sides thereof and being pivotally mounted for swinging movement with the upper blades alternating with the lower blades and adapted to move across the shearing edges of the lower blades and said blades having lateral edge portions formed with angulated shoulders arranged in overlapping relation, a driven rotary shaft, longitudinally spaced cam disks mounted on said shaft and having eccentric peripheries with the highest portions of the peripheries of adjacent disks being diametrically disposed, reciprocatory thrust elements mounted for guided sliding movement and having furcations straddling the overlapped lateral edge portions of adjacent blades, said thrust elements being arranged in engagement with said cam disks respectively and having abutments located between the furcations disposed in engagement with the shoulders of said overlapped lateral edge portions of adjacent blades for imparting relative swinging movement of the upper blades with reference to the lower blades upon turning of said shaft.

2. In a cutter bar of the type including a plurality of upper and lower cutter blades having outwardly converging shearing edges at the opposite sides thereof and being pivotally mounted for swinging movement with the upper blades alternating with the lower blades and adapted to move across the shearing edges of the lower blades and said blades having lateral edge portions formed with angulated shoulders arranged in overlapping relation, a driven rotary shaft, longitudinally spaced cam disks mounted on said shaft and having eccentric peripheries with the highest portions of the peripheries of adjacent cams being diametrically disposed, reciprocatory thrust elements disposed in engagement with said cams respectively and with the angulated shoulders of the overlapping edge portions of adjacent blades, and said thrust elements being mounted for guided sliding movement for imparting relative swinging movement of the upper blades with reference to the lower blades upon turning of said shaft.

CHESTER F. WOOD.

REFERENCES CITED

The following references are of record in the file of this patent:

UNITED STATES PATENTS

| Number | Name | Date |
|---|---|---|
| 404,548 | Lindestrom et al. | June 4, 1889 |
| 426,801 | Hall | Apr. 29, 1890 |
| 428,077 | Crannell | May 20, 1890 |
| 15,672 | Stoddard | Sept. 2, 1856 |